No. 738,105. PATENTED SEPT. 1, 1903.
F. GALE.
ATTACHMENT FOR PLOWS.
APPLICATION FILED DEC. 13, 1900.
NO MODEL. 2 SHEETS—SHEET 1.
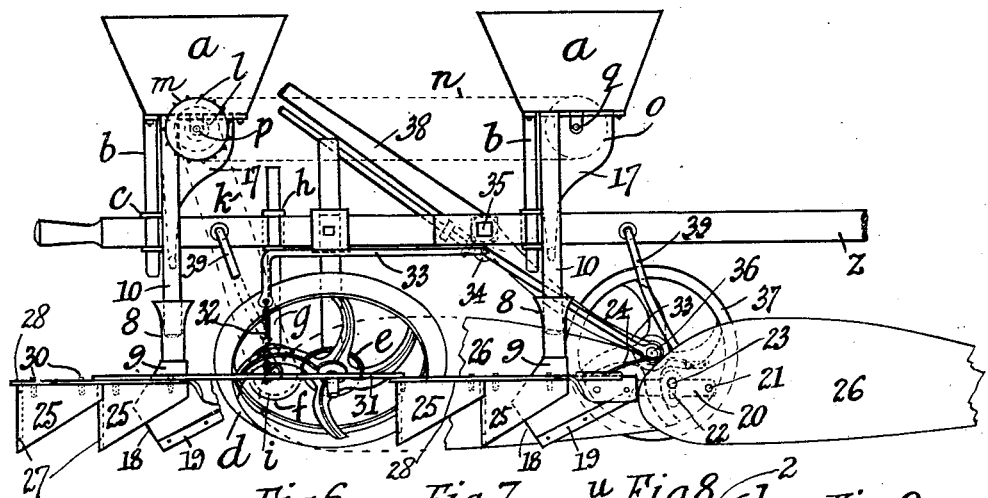
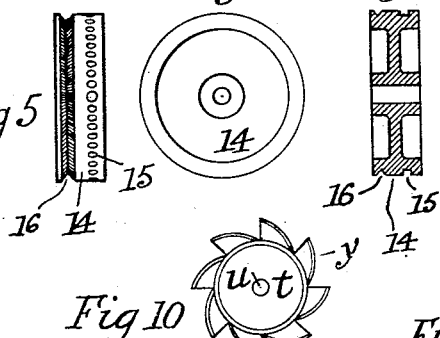
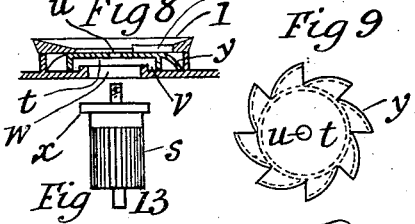
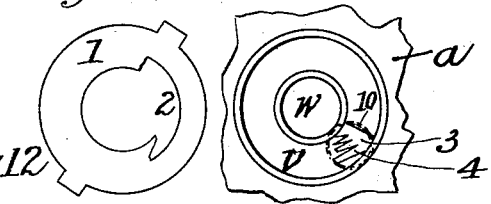
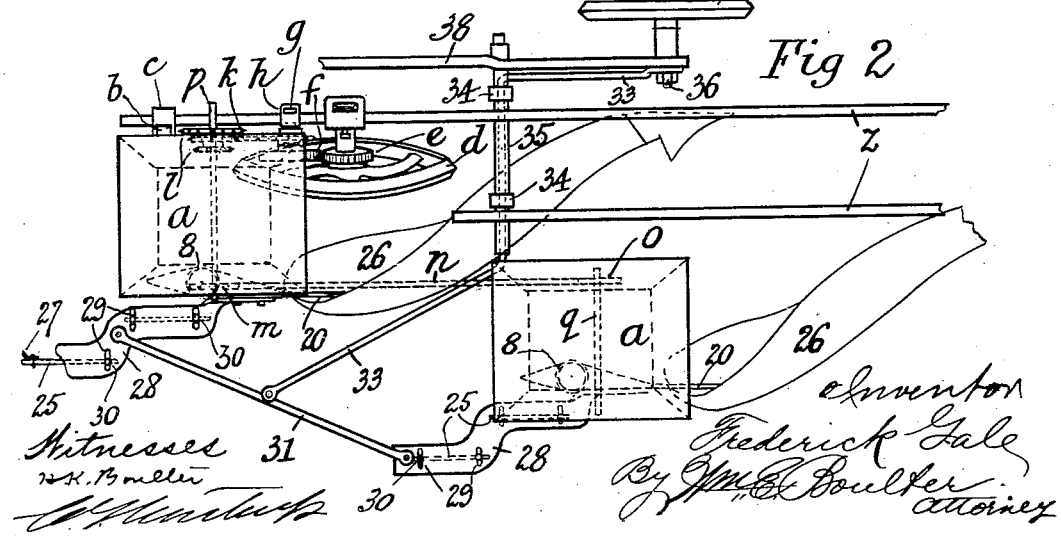

No. 738,105. PATENTED SEPT. 1, 1903.
F. GALE.
ATTACHMENT FOR PLOWS.
APPLICATION FILED DEC. 13, 1900.
NO MODEL. 2 SHEETS—SHEET 2.
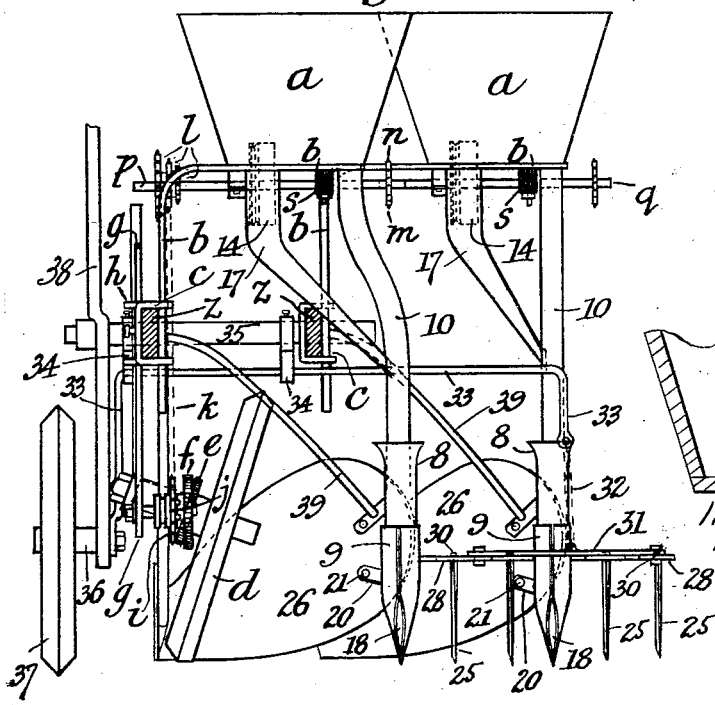
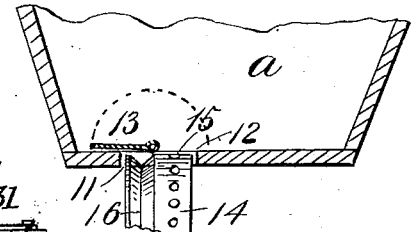
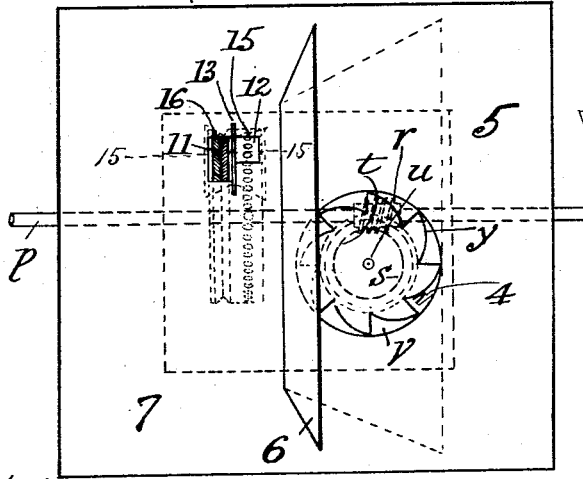
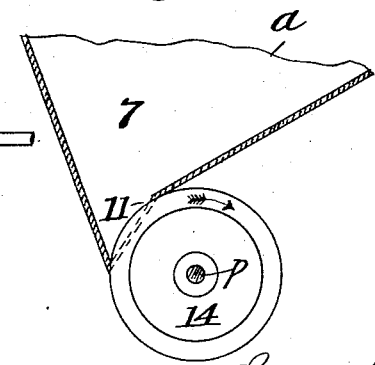
Inventor
Frederick Gale,
By Wm. E. Poulter
Attorney
Witnesses No. 738,105. Patented September 1, 1903.

UNITED STATES PATENT OFFICE.

FREDERICK GALE, OF LANCEFIELD, VICTORIA, AUSTRALIA, ASSIGNOR OF ONE-HALF TO JOHNSTON HEMPHILL, OF LANCEFIELD, AUSTRALIA.

ATTACHMENT FOR PLOWS.

SPECIFICATION forming part of Letters Patent No. 738,105, dated September 1, 1903.

Application filed December 13, 1900. Serial No. 39,616. (No model.)

*To all whom it may concern:*

Be it known that I, FREDERICK GALE, a subject of the Queen of Great Britain and Ireland, residing at High street, Lancefield, in the Colony of Victoria, Australia, have invented certain new and useful Improvements in Attachments for Plows; and I do hereby declare the following to be a full, clear, and exact description of the invention, such as will enable others skilled in the art to which it appertains to make and use the same.

The object of this invention is to provide improvements for the purpose of sowing, manuring, and harrowing in combination with plowing, and to accomplish these objects certain attachments for plows are provided which are neither costly nor troublesome to use and which require very little extra power to work them. These attachments may be used in combination with either a single-furrow or a multifurrow plow, and their advantages are very great, for the time lost and labor required when land is first plowed, then sown and manured, and then harrowed by separate implements is considerable. The ground is also objectionably trampled down, as by the animals which pass over it at each operation. Prior inventions in respect to agricultural implements have effected combinations of one or more operations, especially of plowing and seed sowing; but the invention about to be described provides novel details essential to success, enabling unplowed land to become fully-cultivated manured land with the seed sown (singly when required, as well as at regular distances) in drills and the ground harrowed, so that the seed is free to at once begin growing. Moderately wet weather is no bar to the use of this invention; but where it is desired not to manure the soil that operation is omitted and the manuring-hopper is converted in its upper part into an extension of the seed-hopper. The quantity of manure fed in a given distance is regulated by a simple device. In sowing another simple device enables the implement to be rapidly suited to different kinds of seed—as, for example, peas or wheat. A fixed (or approximately fixed) number of seeds is dropped at a time and led by suitable means to the exact point of the ground required, so that the seed will be economically used and be sown at practically precise intervals. Where this invention is applied to a single-furrow plow, the driving of the hopper mechanism will be effected by any of various known means—for example, by a wheel attached to the beam and running in the furrow behind the moldboard—as will be well understood by those acquainted with this class of invention.

In a plow of two furrows or more having a furrow-wheel an arrangement making use of that wheel is preferred and is illustrated in the drawings herewith. There will be a hopper above the rear of each plowshare, and a chain connection from the rear hopper will drive the mechanism of all the others.

Referring to the drawings herewith, Figures 1 and 2 are on a smaller scale than Fig. 3, and Fig. 3 is on a smaller scale than Figs. 4 to 14. In various figures some parts are broken away or omitted to more clearly indicate other parts. Fig. 1 shows in side view part of a double-furrow plow with the invention attached. Fig. 2 is a plan view of parts in Fig. 1. Fig. 3 shows a back end elevation of the same. Fig. 4 is a plan of the combined seed and manure hopper convertible into a seed-hopper exclusively. Figs. 5, 6, and 7 show the seed-feed wheel in three views—namely, in plan or edge view, in side view, and in vertical transverse section, respectively. Fig. 8 shows a vertical section through the manure-feed wheel, its apertured cover, and part of the hopper-base. Figs. 9 and 10 are plan views of the upper and under side of the manure-feed wheel, respectively. Fig. 11 is a plan view of the seat of the manure-feed wheel with exit, showing also (in dotted lines) a tube which depends from the under side of the same. Fig. 12 is a plan of the apertured cover of the manure-feed wheel, this cover being left out of the other views (except Fig. 8) for greater clearness. Fig. 13 is an elevation of the pinion for driving the manure-feed wheel. Fig. 14 is a side view of the seed-feed wheel and part of the seed-compartment in vertical section. Fig. 15 is a sectional view on the line 15 15 of Fig. 4.

In the drawings the same letters of reference are used to indicate like parts.

*a* in each case is a two-compartment hopper attached above the main frame, as to a beam $z$ of the plow, by any suitable standard $b$, duly clamped or secured to said beam, as by clamp $c$, and bolted or the like to the hopper. To the furrow-wheel $d$ of the plow is attached (either to its arms or around its spindle) a toothed wheel $e$. Another toothed wheel $f$, the support of which is a hanger $g$, is geared to said wheel $e$. The top of hanger $g$ is secured, as by a clamp $h$, to the frame $z$. A light sprocket-wheel $i$ and any suitable clutch, as at $j$, (for putting it in or out of operation,) the construction of which will be well understood by competent mechanics, is provided on the spindle of the wheel $e$. Details (such as the handle) of the clutch are not shown, no claim thereto being made. By moving the clutch the attendant stops (when required) the said sprocket-wheel $i$, and thereby stops the seed-feed wheel and manure-feed wheel, which take their motion from the said (or primary) sprocket-wheel $i$, as next explained.

$k$ is a chain connecting wheel $i$ with one or other of a series of different-sized sprocket-wheels $l$ on a spindle $p$, which passes across beneath the rear hopper $a$ and which has on it another sprocket-wheel $m$, a chain $n$, from which engages a sprocket-wheel $o$ on another spindle $q$, similar to $p$, but under another hopper $a$, so that the spindles of both hoppers will turn simultaneously and equally fast, and so on for as many hoppers as are in use on the implement.

The several sprockets $l$ are all cast integrally and are adjustably slidable on the spindle $p$, so that any desired sized sprocket can be brought in place to receive chain $k$ and can be temporarily fixed or keyed on the spindle in that position. Any suitable tension-pulley (not shown) is provided to keep chain $k$ taut. Each hopper-spindle, as $p$ $q$ aforesaid, is provided with a worm $r$, as shown in Fig. 4 only, which is geared to a pinion $s$, Figs. 3, 4, and 13, which works in a suitable bearing at the base of the hopper and is connected to a manure-feed wheel $t$, Figs. 8 to 10, (as at the center aperture $u$, which receives the top of the pinion-spindle.) Wheel $t$ turns in an annular well $v$, Figs. 4, 8, and 11, at the base of the manure-compartment of the hopper, to which base the sides all around slope. An aperture $w$ is provided in the well center, Figs. 8 and 11, to enable the pinion to be dropped through the same into place, a collar $x$ at the top of the pinion being large enough to rest upon the circumference of the said aperture, the wheel $t$ thus resting upon the said collar. The wheel $t$ has all around its edge sheet-metal vanes, cutters, or teeth $y$, Figs. 4, 8, to 10, each forming the outside of a somewhat triangular pocket. (Seen in Fig. 10.) After pinion $s$ is put in place and wheel $t$ put over and secured to it, as by a nut, (for the purpose next described,) then a centrally open plate 1, Figs. 8 and 12, which is of slightly larger diameter than well $v$, is put over the wheel $t$ and is rested (so that it cannot turn or rise) on the same and on the sides of said well. If any hard foreign substance which the vanes cannot divide gets in their path, then the wheel $t$ will stop, the connection (as said nut) to the pinion being so arranged that it may loosen and enable the pinion to continue moving. The attendant may then in due course remove the obstruction and tighten the nut. 2 is a side enlargement (of the central aperture in plate 1) above teeth or vanes $y$. The manure which is in the hopper above said plate cannot get to or meet the vanes $y$ except through this aperture 2, which is made comparatively small. This prevents excessive discharge of manure and clogging of the vanes.

3 is a small aperture in the base of well $v$, but not central, and this is provided with a comb edge 4, Figs. 4 and 11. This aperture 3 is the only exit for the manure, and it is so located as not to be directly under aperture 2. The manure has thus to be carried around some distance by vanes $y$ before it can reach aperture 3. If it is desired to reduce the amount of manure fed, a wheel $t$ may be inserted having smaller pockets. For example, part or all of the space contained by the triangular pockets seen in Fig. 10 may be made of solid metal. The manure will then still fill whatever spaces occur between the well-walls and the vanes, Figs. 4 and 8, and will be carried around to aperture 3.

The manure used, though normally floury, will, if lumpy, be disintegrated by the vanes or cutters and the comb 4 before it leaves the manure-compartment 5. In cases where the comb 4 does not insure the manure dropping in a sufficiently-divided state a finer comb may be substituted or finer divisions of the space 3 be otherwise produced. A door 6 (hinged at its base) forms a division between this compartment and the seed-compartment 7, and this door when shifted from its normal vertical position and allowed to fall down on one side, as seen in Fig. 4, has the effect of considerably enlarging compartment 7 and closing compartment 5, and this is done when desired when manuring is not required. The rate of the manure-feed is regulated by the diameter of whichever sprocket-wheel $l$ is in gear with chain $k$ at the time. The manure after leaving its compartment 5 of the hopper passes to a rubber or flexible tube 10 and thence to a funnel 8, which is of metal and permanently fixed upon the upper rear part 9 of a furrow-drill. To allow the furrow-drill to be raised when required and when at a headland, the base of this tube 10 is loose in the top of the funnel. The seed-compartment 7 has each of its sides sloping to its base, at which is a small aperture for the discharge or exit of seed. This aperture is in two parts marked 11 and 12, the latter being the shorter, between which parts is a door or partition 13, (shown vertical in Fig. 4, though it is not normally in that position,) which in practice is to be hinged so that it can be dropped to either side, so completely closing either part of the aperture. Part of the edge of a seed-feed wheel 14, which is fixed to the hopper-spindle, as $p$, fits up into this aperture, (it is important it should project up into the part 11,) preventing seed dropping out vertically and also enabling the wheel 14 as it revolves to carry out of the hopper by reason either of the pockets 15 or the groove 16 (both sides of which groove are fluted) a regular quantity of seed.

The pockets are the size to hold four grains (or other predetermined quantity) of wheat without any part thereof projecting above the periphery, or they will do well for sowing rye, well-dressed barley, and other small seeds, while the fluted groove is for any grain for which the pockets are not preferred. For example, badly-bearded barley, oats, maize, and peas may all be sown by using the fluted groove, the flutings preventing the wheel 14 slipping around without carrying the seed with it. The groove is of V or like section and narrow. The seed does not go into it crosswise, but only longitudinally. The wheel 14 works upwardly, as shown by arrow in Fig. 14, the aperture 11 12 being in a sloping side of the seed-compartment, and this insures not only a complete absence of choking of the wheel during work, but the relative positions of the parts insure a constant supply of seed to the wheel so long as any remains in the compartment.

The hopper is preferably made with a bottom of cast-iron with turned-up edges, the body of the hopper (which may be of sheet metal and which has a water-tight cover, not shown) being affixed thereto. There is a seed-chute 17 provided, the top of which surrounds the base of each wheel 14, and each chute leads into a manure-tube 10, so that both seed and manure thence pass together to the drill.

The drill is hollow and narrows toward an oblique rear exit or aperture 18, the effect being to allow the earth which the drill passes through to fall onto the seed and manure and cover it immediately the drill has passed. At the front end of the drill or furrow-opener is attached an obliquely-set renewable cutting-blade 19. A drill is fixed to each moldboard 26, but not rigidly. A bar 20, the rear end of which is fixed to the drill-front, has its front end pivoted to the moldboard, as by a pin 21. As seen in Fig. 1, there is a slot 22 (which may be of any length) in bar 20, through which a pin 23 from the moldboard projects, and this slot allows the drill to rise and fall on its pivot freely, according to the resistance of the ground. 24 is a spring attached to the moldboard or frame above the bar 20, the object of which is to keep pressure thereon, so as to depress the drill quickly when it has been raised.

To the back of each drill is provided a harrow of two blades, each marked 25 and each having a renewable vertical strip 27, as seen in Fig. 2 and dotted in Fig. 1, attached thereto.

These strips or narrow plates 27 can be fixed to either side of any harrow blade or blades where desired to open out or break the ground when the latter is of such a clayey or like nature that the harrow would otherwise simply make a narrow cut in it. In order that the position of each harrow may be easily altered, the blades 25 are attached to an upper plate 28, which has in it laterally-extending slots marked 29, Fig. 2. Projections upward from the harrow-plate 25 enter these slots and are suitably secured, as by nuts 30, in any position required. To facilitate the raising of the harrows when required, the plates 28 are connected by a rod 31, and this rod is connected by a pair of chains or a single chain 32 to one end of a bent lever 33, which has each end bent downwardly, the middle being horizontally supported in bearings 34, secured to any suitable part of the framing of the plow, as to the cross-bar 35. The other end of the bent lever 33 is secured to the spindle 36 of the land-wheel 37, which is operated by any usual means, as lever 38, when turning a headland, thus lifting the harrows and the other cultivating parts of the plow out of the ground. The moldboards have suitable stays, as 39.

Those features above mentioned which are novel may be applied to any suitable style of plow other than that illustrated, while in respect to the form, relative sizes, number, and positions of the novel parts any desired modifications may be made which adhere to the spirit of the invention.

What I claim as my invention, and desire to secure by Letters Patent of the United States, is—

1. In an attachment for plows, the combination with the plow-frame, of a hopper having two compartments, one for seed and the other for manure, the said compartments being provided with a discharge-aperture dividing it into two portions, a door hinged at its bottom and being arranged intermediate the two portions of the aperture, as described, a seed-feed wheel projecting up into the longer portion of the aperture, the said wheel being provided with a series of seed-pockets and a circumferential groove, all as and for the purpose specified.

2. In an attachment to plows, the combination with a drill, of a moldboard, and a bar 20 having one end fixed to the drill and the other end pivoted to the moldboard, said bar having a slot 22, a pin on the moldboard projecting into said slot, and a spring arranged to depress the drill.

3. In an attachment for plows, the combination of a plow-frame, an open-bottom hopper, a seed-feed wheel adapted to revolve in said hopper, said wheel having a V-shaped fluted groove and pockets on the periphery thereof, and a hinged partition over said wheel, substantially as described.

4. In an attachment for plows, the combination of a plow-frame, a two-compartment hopper, one of said compartments being adapted to receive manure, and the other compartment being adapted to receive seed, seed and manure feed wheels arranged in said compartments respectively, means for covering either of said compartments alternately, said seed-feed wheel being provided with a V-shaped fluted groove, and with pockets on its periphery, and a hinged partition over said seed-wheel, substantially as described.

5. In an attachment for plows, the combination of a plow-frame, a plurality of two-compartment hoppers mounted thereon, one of said compartments being adapted to receive manure, and the other adapted to receive seed, a swinging door in each hopper, manure and seed feed wheels underneath said compartments respectively, each of said seed-feed wheels being provided with a V-shaped groove, and with pockets on its periphery, and a hinged partition located above said seed-feed wheel, substantially as described.

6. In an attachment for plows, the combination of a plow-frame, of a two-compartment hopper, one compartment being adapted to receive manure, and the other to receive seed, a feed-wheel mounted in the bottom of said manure-compartment, said feed-wheel being also adapted to disintegrate masses of manure, a seed-feed wheel carried beneath said second compartment, and provided with a V-shaped fluted groove, and with feed-pockets on its periphery, a hinged door adapted to cover either of said compartments or to leave them both open, said door being arranged centrally in said hopper, and a second hinged door or partition 13 located above said seed-feed wheel, substantially as described.

In testimony whereof I affix my signature in presence of two witnesses.

FREDERICK GALE.

Witnesses:
W. H. CUBLEY,
G. G. TURRI.